(12) United States Patent
Turnbull

(10) Patent No.: US 7,232,077 B2
(45) Date of Patent: Jun. 19, 2007

(54) FLUID LEVEL SENSING APPARATUS AND METHOD FOR A SPRAY APPLICATOR

(75) Inventor: Clifford W. Turnbull, Auburn, WA (US)

(73) Assignee: Trade Associates, Inc., Auburn, WA (US)

( * ) Notice: Subject to any disclaimer, the term of this patent is extended or adjusted under 35 U.S.C. 154(b) by 12 days.

(21) Appl. No.: 10/738,916

(22) Filed: Dec. 16, 2003

(65) Prior Publication Data

US 2005/0127202 A1  Jun. 16, 2005

(51) Int. Cl.
*B05B 17/00* (2006.01)
*B67D 5/38* (2006.01)

(52) U.S. Cl. .............. 239/1; 239/71; 239/72; 239/74; 239/290; 239/379; 239/525; 239/DIG. 14; 340/620; 73/304 C

(58) Field of Classification Search .......... 239/1, 239/8, 71, 72, 74, 290, 296, 346, 351, 419, 239/433, 525, 526, DIG. 14, DIG. 17, 379; 222/23, 39, 51; 137/558; 340/612, 618, 340/620; 73/304 C, 304 R
See application file for complete search history.

(56) References Cited

U.S. PATENT DOCUMENTS 3,939,360 A * 2/1976 Jackson .................. 340/620
4,483,463 A * 11/1984 Buschmann ............... 73/304 C
5,238,029 A    8/1993 Akeel
5,518,186 A *  5/1996 Weinstein ................. 118/629
5,628,463 A *  5/1997 Nakamura ................. 239/526
5,636,799 A *  6/1997 Trusty et al. .............. 239/708
5,655,896 A    8/1997 Konieczynski
5,835,018 A * 11/1998 Kursel et al. ............. 340/620
6,536,683 B1 * 3/2003 Filicicchia et al. ......... 239/67

* cited by examiner

*Primary Examiner*—Steven J. Ganey
(74) *Attorney, Agent, or Firm*—Dorsey & Whitney LLP

(57) ABSTRACT

The present invention relates to a level sensing spray applicator. In one embodiment, the spray applicator includes a gun that receives a liquid and a supply vessel coupled to the gun. The vessel includes a level sensor responsive to the volume retained by the supply vessel. In another aspect, a level-sensing supply vessel includes a level sensor responsive to a volume of liquid retained by the supply vessel, the sensor including a sensor element to detect the volume by sensing a resistance property of the liquid. In still a further aspect, a method of sensing a level of a liquid retained within a storage vessel includes sensing a first liquid volume, removing a portion of the first volume to define a second volume, determining if the second volume is less than a minimum volume, and generating an alarm signal if the second volume is less than the minimum volume.

39 Claims, 4 Drawing Sheets

FLUID LEVEL SENSING APPARATUS AND METHOD FOR A SPRAY APPLICATOR

TECHNICAL FIELD

The present invention relates generally to equipment for applying a liquid to surfaces, and more particularly, to fluid level sensing for a spray applicator device.

BACKGROUND OF THE INVENTION

A wide variety of spray application devices for applying liquids such as paint, varnish, cleaning solvents, or other liquid materials to a surface are known. Typically, such spray applicator devices include a supply vessel that contains a volume of the liquid to be applied to the surface. The liquid is transferred from the supply vessel to a spray gun that atomizes the liquid and projects the atomized liquid towards the surface. In one example of a spray applicator device, the supply vessel is positioned above the spray gun so that the liquid is transferred to the spray gun by a gravity-feed system. In another example of an applicator device, the supply vessel may be positioned below the spray gun and internally pressurized to transfer the liquid upwardly into the gun. In still other examples, the vessel may be positioned remotely relative to the gun so that the liquid is transferred from the vessel to the spray gun through a flexible hose.

In all of these spray applicator devices, determining the volume of the liquid remaining in the supply vessel as the application of the liquid proceeds constitutes a significant problem. If the liquid volume in the supply vessel is reduced to a low value, the gun may be supplied with liquid only intermittently, so that the gun emits the atomized liquid on an interrupted basis. As a consequence, the spray applicator device fails to apply the liquid uniformly to the surface. In particular, when the spray applicator device is used to apply a paint material to a surface, surface imperfections in the paint finish may result when non-atomized paint is projected, or "sputtered" onto the surface, thus necessitating time consuming surface rework and re-painting. Since supply vessels commonly used with spray guns are comprised of materials that are substantially non-transparent, a visual indication of the liquid level in the supply vessel is not generally possible.

Accordingly, there is a need in the art for a level-sensing device for spray applicators to provide a user of the spray applicator with an audible or visual indication when the volume of liquid in the supply vessel has been reduced to a predetermined level.

SUMMARY OF THE INVENTION

The present invention relates generally to a spray applicator device for applying a liquid to surfaces, and more particularly, to a fluid level sensing apparatus and method for a spray applicator device. In one aspect, a spray applicator apparatus includes a gun configured to receive a liquid and atomize the liquid, and a supply vessel coupled to the gun. The supply vessel retains a volume of the liquid and includes a level sensor responsive to the volume retained by the supply vessel. In another aspect, a level-sensing supply vessel for a spray applicator includes a level sensor responsive to a volume of liquid retained by the supply vessel, the sensor including a sensor element configured to detect the volume by sensing a resistance property of the liquid. In still a further aspect, a method of sensing a level of a liquid retained within a storage vessel of a spray applicator includes sensing a first volume retained within the vessel, removing a portion of the first volume to define a second volume, determining if the second volume is less than a predetermined minimum volume, and generating an alarm signal if the second volume is less than the predetermined minimum volume.

DETAILED DESCRIPTION OF THE INVENTION

The present invention is generally directed to equipment for applying liquid coating materials to surfaces, and in particular, to fluid level sensing for a spray applicator. Many of the specific details of certain embodiments of the invention are set forth in the following description and in FIGS. 1–8 to provide a thorough understanding of such embodiments. One skilled in the art will understand, however, that the present invention may be practiced without several of the details described in the following description. Moreover, in the description that follows, it is understood that the figures related to the various embodiments are not to be interpreted as conveying any specific or relative physical dimension. Instead, it is understood that specific or relative dimensions related to the embodiments, if stated, are not to be considered limiting unless the claims expressly state otherwise.

Figure 1:
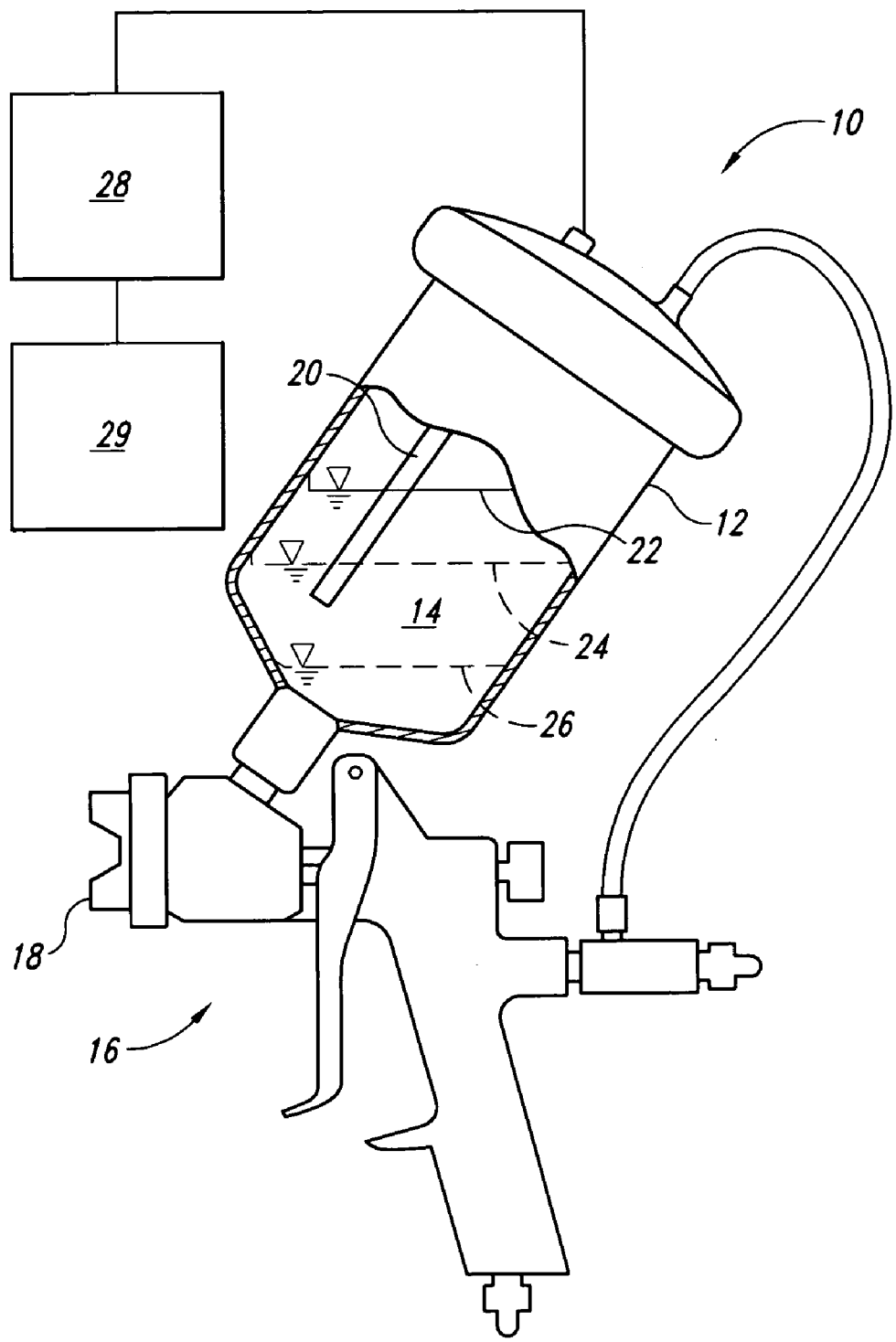
FIG. 1 is a partial diagrammatic view of a spray applicator according to an embodiment of the invention.

FIG. 1 is a partial diagrammatic view of a spray applicator 10 according to an embodiment of the invention. The spray applicator 10 includes a supply vessel 12 that contains a volume of a liquid 14. A spray gun 16 is coupled to the supply vessel 12, and transfers the liquid 14 to the spray gun 16 so that an atomized spray pattern may be developed at a nozzle 18. As the spray pattern is emitted from the gun 16, the liquid 14 retained within the supply vessel 12 is gradually depleted, so that a surface level of the liquid 14 gradually descends as the spraying operation is conducted. Operational details of the spray gun 16 are well known in the art, and need not be discussed in further detail. Although a gravity-feed type spray applicator is shown in FIG. 1, it is understood that the various embodiments of the present invention may also be employed in other types of spray applicators, and are therefore not limited to the spray gun shown in FIG. 1. For example, the supply vessel 12 may be positioned below the spray gun 16, or alternately may be located remotely from the spray gun 16 so that the liquid 14 is transferred to the spray gun 16 by a flexible hose, or other similar devices (not shown).

Still referring to FIG. 1, the spray applicator 10 further includes a sensor element 20 that extends into the liquid 14 within the supply vessel 12. The sensor element 20 is configured to allow an electrical resistance property of the liquid 14 to be measured that corresponds to a volume of liquid 14 retained within the vessel 12. For example, when the volume of liquid 14 defines a first level 22 within the supply vessel 12, a first resistance quantity may be measured by the sensor element 20. As the volume of the liquid 14 is gradually reduced to define a relatively lower intermediate level 24, a second resistance quantity that differs from the first resistance quantity may be read by the sensor element 20. As the level of the volume of the liquid 14 is reduced still further to define a second level 26, so that the sensor element 20 is no longer immersed in the liquid 14, the sensor element 20 ceases to measure a resistance quantity related to the liquid 14, so that only a resistance property related to the sensor element 20 is measurable. The sensor element 20 will be described in further detail below.

Figure 2:
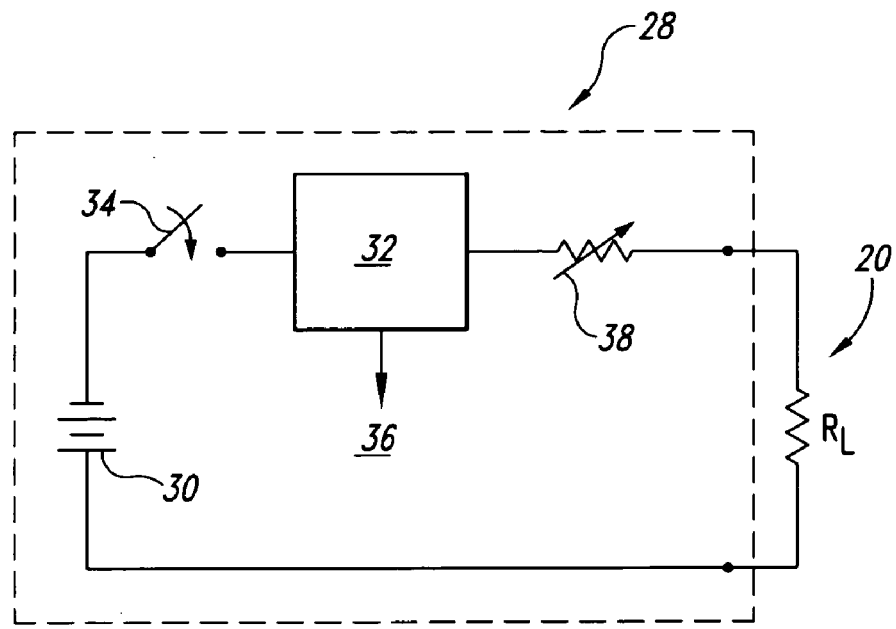
FIG. 2 is a schematic view of a control system for a spray applicator having a level sensor according to an embodiment of the invention.

A control system 28 is operatively coupled to the sensor element 20. The control system 28 includes circuitry that is configured to measure electrical resistance quantities sensed by the sensor element 20, and to output a control signal when a predetermined resistance quantity is measured. Referring now to FIG. 2, a particular embodiment for the control system 28 of FIG. 1 is shown. The control system 28 includes a voltage source 30 that is selectively coupled to a current-sensing network 32 by a switch 34. The system 28 is coupled to the sensor element 20, which has a resistance value ($R_L$) that depends upon the volume of the liquid 14 retained by the supply vessel 12, as previously described. With the switch 34 closed, the system 28 is energized and current flows in the resistance $R_L$. The current-sensing network 32 measures a current flowing in the control system 28 and generates an output signal 36 when a predetermined current level corresponding to a predetermined volume of the liquid 14 is reached. In order to adjustably control the current flowing in the system 28, a potentiometer 38 may be serially coupled to the sensor element 20. In an alternative particular embodiment, the potentiometer 38 may be coupled in parallel with the sensor element 20.

Figure 3:
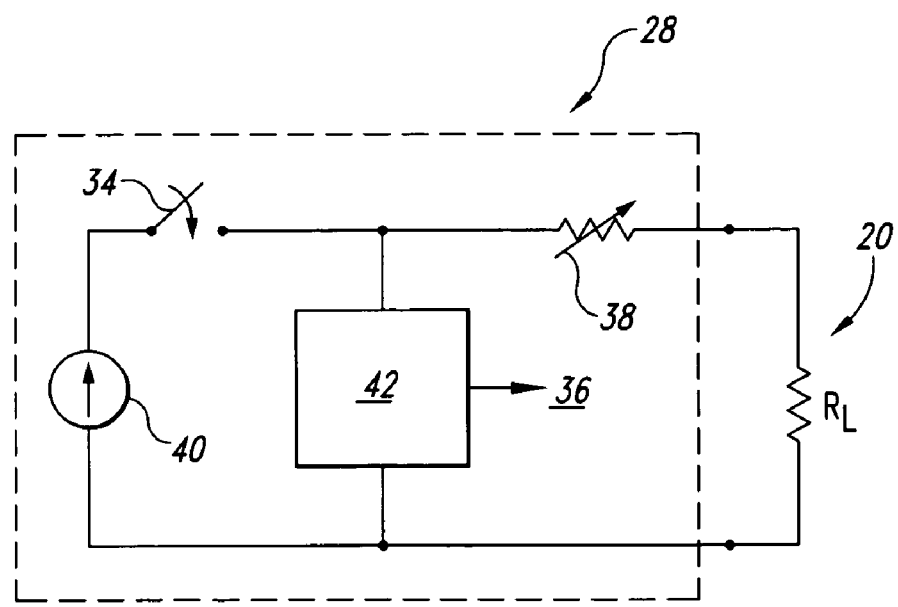
FIG. 3 is a is a schematic view of a control system for a spray applicator having a level sensor according to another embodiment of the invention.

Turning now to FIG. 3, another particular embodiment for the control system 28 of FIG. 1 is shown. In this embodiment, the control system 28 includes a current source 40 that is selectively coupled to a voltage-sensing network 42 by the switch 34. The system 28 is coupled to the sensor element 20. With the switch 34 closed, the system 28 is energized and a constant current flows in the resistance $R_L$. The voltage-sensing network 42 measures a voltage across the resistance $R_L$ and generates an output signal 36 when a predetermined voltage corresponding to a predetermined volume of the liquid 14 is reached. To adjustably control the voltage appearing across the resistance $R_L$, a potentiometer 38 may be serially coupled to the sensor element 20. In still another alternative particular embodiment, the potentiometer 38 may be coupled in parallel with the sensor element 20.

Returning to FIG. 1, the control system 28 is coupled to an alarm device 29 that is configured to emit an alarm indication when a suitable output signal 36 is received from the control system 28. In one specific embodiment of the invention, the alarm device 29 may be a visual alarm device, such as an incandescent light bulb, light emitting diode (LED), or other similar devices that illuminate when the output signal 36 is received. In another specific embodiment, the alarm device may be an audible alarm device, such as a piezoelectric speaker device, or other similar device capable of emitting acoustic energy that may be perceived by an operator of the spray applicator 10. The alarm device 29 may also include a source of electrical energy to energize the audible or visual alarm device, or alternately, the alarm device 29 may receive electrical energy from the electrical energy source located within the control system 28.

The operation of the spray applicator 10 will now be described in detail. Still referring to FIG. 1, the supply vessel 12 on the spray applicator 10 is supplied with an initial volume of the liquid 14 that defines the first level 22. At this point, the sensor element 20 senses a first resistance quantity corresponding to the initial volume of the liquid 14. Since the sensed first resistance quantity corresponds to a supply vessel 12 that contains a suitable amount of the liquid 14, the control system 28 does not generate an output signal 36 (as shown in FIGS. 2 and 3) so that the alarm device 29 does not generate an audible or visual signal. As the liquid 14 is drawn from the supply vessel 12, the volume of the liquid 14 decreases to the second level 26, so that a different resistance quantity is sensed. Since the sensor 20 is no longer exposed to the liquid 14, the output signal 36 is generated by the control system 28 in response to the different resistance quantity. Accordingly, the alarm device 29 generates the audible or visual alarm that alerts the operator of the spray applicator 10 that the liquid 14 in the supply vessel has been depleted. Although the foregoing describes the output signal 36 as generated when the supply vessel 12 is substantially depleted, it is understood that the control system 28 may be configured to generate the output signal 36 when the volume of liquid 14 has decreased to a value that is intermediate between a full and a depleted state. For example, and referring still to FIG. 1, the control system 28 may be configured to generate the output signal 36 when the volume of liquid 14 falls to the intermediate level 24.

Figure 4:
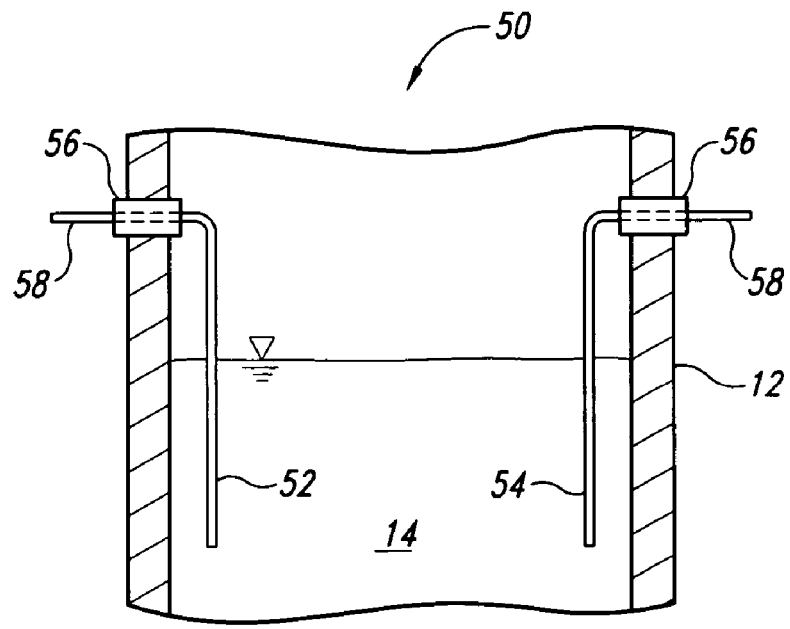
FIG. 4 is a partial cross-sectional view of a supply vessel for a spray applicator having a level sensor according to another embodiment of the invention.

FIG. 4 is a partial cross sectional view of the supply vessel 12 of FIG. 1 that shows a sensor element 50 according to another embodiment of the invention. The sensor element 50 includes a first electrode 52 and a second electrode 54 that is spaced apart from the first electrode 52. The first electrode 52 and the second electrode 54 are comprised of an electrically conductive material, and are structured to extend through a wall of the supply vessel 12 and to extend downwardly into the liquid 14 within the supply vessel 12. In order to electrically isolate the first electrode 52 and the second electrode 54 from the wall of the supply vessel 12, insulators 56 are interposed between the first electrode 52, the second electrode 54 and the wall of the supply vessel 12. The first electrode 52 and the second electrode 54 may further include extended portions 58 to permit the sensor element 50 to be coupled to the control system 28.

Figure 5:
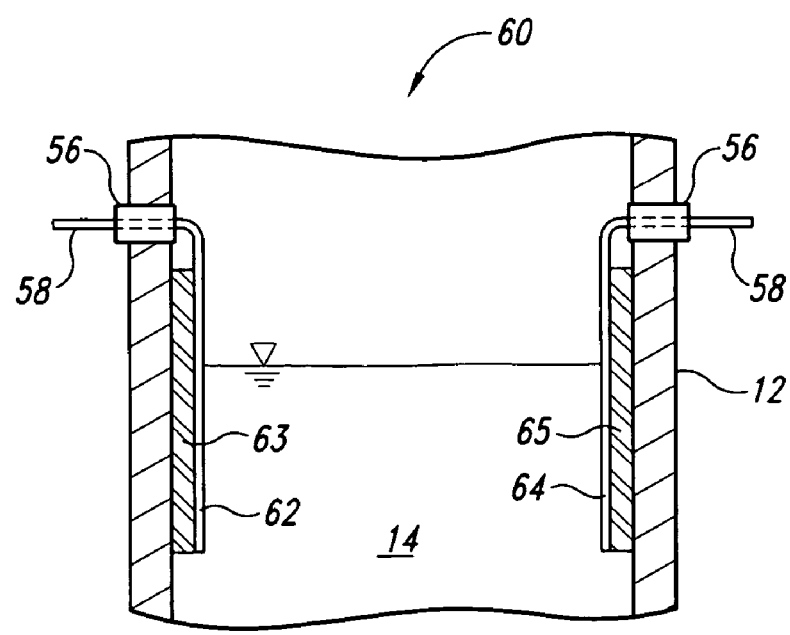
FIG. 5 is a partial cross-sectional view of a supply vessel for a spray applicator having a level sensor according to still another embodiment of the invention.

FIG. 5 is a partial cross sectional view of the supply vessel 12 of FIG. 1 that shows a sensor element 60 according to still another embodiment of the invention. As in the previous embodiment, the sensor element 60 includes a first electrode 62 and a second electrode 64 that is spaced apart from the first electrode 62. The first electrode 62 and the second electrode 64 are similarly comprised of an electrically conductive material, and positioned adjacent to the wall of the supply vessel 12 and spaced apart from the wall by respective insulating layers 63 and 65. The first electrode 62 and the second electrode 64 are electrically isolated from the wall of the supply vessel 12 by insulators 56 that extend through the wall of the supply vessel 12. The first electrode 62 and the second electrode 64 also may include extended portions 58 to permit the sensor element 50 to be coupled to the control system 28.

Figure 6:
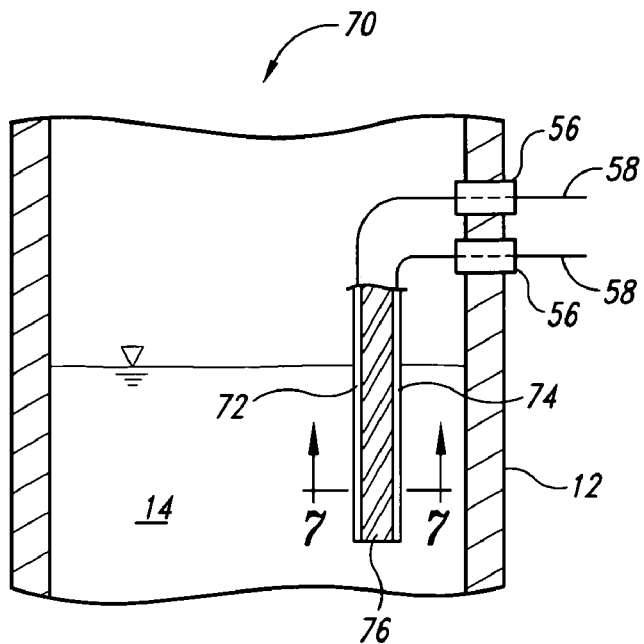
FIG. 6 is a partial cross-sectional view of a supply vessel for a spray applicator having a level sensor according to still yet another embodiment of the invention.
Figure 7:
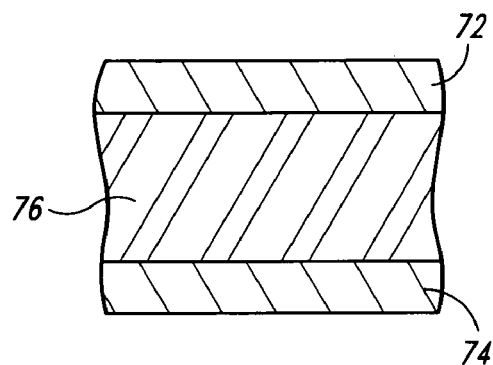
FIG. 7 is a cross sectional portion of a sensor element according to still yet another embodiment of the invention.

FIG. 6 is a partial cross sectional view of the supply vessel 12 of FIG. 1 that shows a sensor element 70 according to still yet another embodiment of the invention. The sensor element 70 includes a first electrode 72 and a second electrode 74 that are formed on an insulating substrate 76 that extends downwardly into the supply vessel 12. Referring briefly to FIG. 7, a cross sectional portion of the sensor element 70 is shown along the section line 7—7 of FIG. 6. The first electrode 72 and the second electrode 74 may be formed from a relatively thin and electrically conductive foil that is cladded onto the insulating substrate 76. The substrate 76 may be comprised of a generally rigid, nonconductive material such as a rigid polymer. The sensor element 70 is suspended within the liquid 14 by an insulating support means (not shown) that is coupled to the wall of the supply vessel 12. As in the previous embodiments, the first electrode 72 and the second electrode 74 may be coupled to the control system 28 by extended portions 58 that project through the wall of the supply vessel 12.

Figure 8:
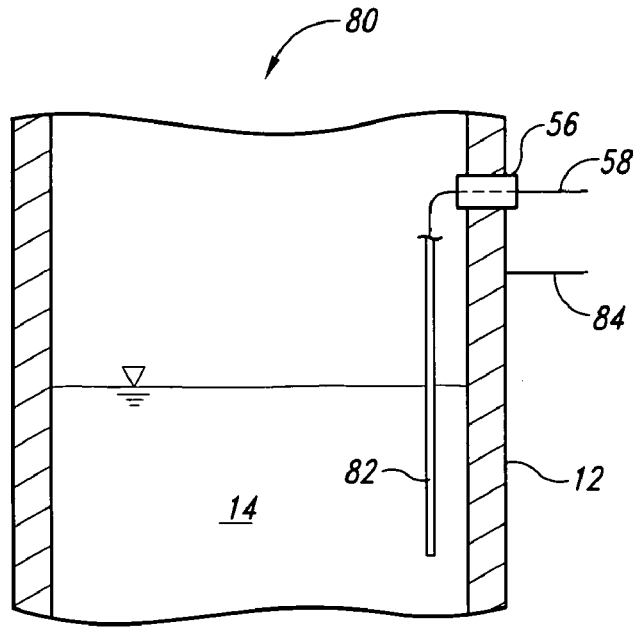
FIG. 8 is a partial cross-sectional view of a supply vessel for a spray applicator having a level sensor according to a further embodiment of the invention.

FIG. 8 is a partial cross sectional view of the supply vessel 12 of FIG. 1 that shows a sensor element 70 according to a further embodiment of the invention. The sensor element 70 includes an electrode 82 formed from an electrically conductive material, which extends downwardly into the supply vessel 12 and is spaced apart from the wall of the supply vessel 12. Instead of an electrode that opposes electrode 82, as in the previous embodiments, the wall of the supply vessel 12 forms an electrode opposite the first electrode 62. The first electrode 82 is coupled to the control system 28 by an extended portion 58 that extends through the wall of the supply vessel 12, and is electrically insulated from the wall by an insulator 56. The supply vessel 12 is also coupled to the control system 28 by a lead 84 that is conductively coupled to the supply vessel 12.

From the foregoing it will be appreciated that, although specific embodiments of the invention have been described herein for purposes of illustration, various modifications may be made without deviating from the spirit and scope of the invention. For example, certain features shown in the context of one embodiment of the invention may be incorporated into other embodiments as well. Accordingly, the invention is not limited by the foregoing description of embodiments except as by the following claims.

The invention claimed is:

1. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a first electrode spaced apart from a second electrode, the first electrode and the second electrode being positioned adjacent to a wall of the supply vessel, the first electrode and the second electrode being spaced apart from the wall of the supply vessel by an insulating layer interposed between the wall and the first and second electrodes.

2. The spray applicator of claim 1, wherein the first and second electrodes extend into the supply vessel, the first and second electrodes being configured to detect a liquid volume by sensing a resistance property of the liquid.

3. The spray applicator of claim 1, wherein the level sensor further includes a control system coupled to the supply vessel that generates a signal when a predetermined liquid volume is retained in the supply vessel.

4. The spray applicator of claim 3, wherein the level sensor further includes an alarm device coupled to the control system to receive the signal and generate an alarm indication.

5. The spray applicator of claim 3, wherein the control system includes a current-sensing network coupled to a voltage source.

6. The spray applicator of claim 3, wherein the control system includes a voltage-sensing network coupled to a current source.

7. A level-sensing supply vessel for a spray applicator, comprising:
a level sensor responsive to a volume of a liquid retained by the supply vessel, the sensor including a sensor element configured to detect the volume by sensing a resistance property of the liquid, the level sensor including a first electrode spaced apart from a second electrode, the first electrode and the second electrode being positioned adjacent to a wall of the supply vessel, the first electrode and the second electrode being spaced apart from the wall of the supply vessel by an insulating layer interposed between the wall and the first and second electrodes.

8. The level-sensing supply vessel of claim 7, wherein the level sensor further includes a control system coupled to the supply vessel that generates a signal when a predetermined liquid volume is retained in the supply vessel.

9. The level-sensing supply vessel of claim 8, wherein the level sensor further includes an alarm device coupled to the control system to receive the signal and generate an alarm indication.

10. The level-sensing supply vessel of claim 8, wherein the control system includes a current-sensing network coupled to a voltage source.

11. The level-sensing supply vessel of claim 8, wherein the control system includes a voltage-sensing network coupled to a current source.

12. A method of sensing a level of a liquid retained within a storage vessel of a spray applicator, comprising:
sensing a first volume of the liquid retained within the vessel solely based upon a first resistance value of the liquid;
removing a portion of the first volume to define a second volume within the storage vessel;
sensing the second volume solely based upon a second resistance value of the liquid;
comparing the first resistance value to the second resistance value; and
generating an alarm signal if the second resistance value is indicative of the second volume being less than a predetermined minimum volume.

13. The method of claim 12, wherein generating an alarm signal further comprises generating an audible alarm.

14. The method of claim 12, wherein generating an alarm signal further comprises generating a visual alarm.

15. The method of claim 12, wherein removing a portion of the first volume to define a second volume further comprises expelling the portion through a spray gun coupled to the supply vessel.

16. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a first electrode spaced apart from a second electrode, the first electrode and the second electrode being formed on opposing sides of an insulating substrate.

17. The spray applicator of claim 16, wherein the first and second electrodes extend into the supply vessel, the first and second electrodes being configured to detect a liquid volume by sensing a resistance property of the liquid.

18. The spray applicator of claim 16, wherein the level sensor further includes a control system coupled to the supply vessel that generates a signal when a predetermined liquid volume is retained in the supply vessel.

19. The spray applicator of claim 18, wherein the level sensor further includes an alarm device coupled to the control system to receive the signal and generate an alarm indication.

20. The spray applicator of claim 18, wherein the control system includes a current-sensing network coupled to a voltage source.

21. The spray applicator of claim 18, wherein the control system includes a voltage-sensing network coupled to a current source.

22. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a first electrode spaced apart from a second electrode, the first electrode and the second electrode being positioned adjacent to a wall of the supply vessel, the supply vessel further including a wall that comprises one of the first electrode and the second electrode.

23. The spray applicator of claim 22, wherein the first and second electrodes extend into the supply vessel, the first and second electrodes being configured to detect a liquid volume by sensing a resistance property of the liquid.

24. The spray applicator of claim 22, wherein the level sensor further includes a control system coupled to the supply vessel that generates a signal when a predetermined liquid volume is retained in the supply vessel.

25. The spray applicator of claim 24, wherein the level sensor further includes an alarm device coupled to the control system to receive the signal and generate an alarm indication.

26. The spray applicator of claim 25, wherein the control system includes a current-sensing network coupled to a voltage source.

27. The spray applicator of claim 25, wherein the control system includes a voltage-sensing network coupled to a current source.

28. A level-sensing supply vessel for a spray applicator, comprising:
a level sensor responsive to a volume of a liquid retained by the supply vessel, the sensor including a sensor element configured to detect the volume by sensing a resistance property of the liquid, the sensor element including a first electrode spaced apart from a second electrode, the first electrode and the second electrode being formed on opposing sides of an insulating substrate.

29. The level-sensing supply vessel of claim 28, wherein the level sensor further includes a control system coupled to the supply vessel that generates a signal when a predetermined liquid volume is retained in the supply vessel.

30. The level-sensing supply vessel of claim 29, wherein the level sensor further includes an alarm device coupled to the control system to receive the signal and generate an alarm indication.

31. The level-sensing supply vessel of claim 29, wherein the control system includes a current-sensing network coupled to a voltage source.

32. The level-sensing supply vessel of claim 29, wherein the control system includes a voltage-sensing network coupled to a current source.

33. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a sensor element configured to detect a liquid volume solely by sensing a resistance property of the liquid;
wherein the level sensor further includes a control system coupled to the supply vessel that generates a signal when a predetermined liquid volume is retained in the supply vessel; and
wherein the control system includes a current-sensing network coupled to a voltage source.

34. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a sensor element configured to detect a liquid volume solely by sensing a resistance property of the liquid;
wherein the level sensor further includes a control system coupled to the supply vessel that generates a signal when a predetermined liquid volume is retained in the supply vessel; and
wherein the level sensor further includes an alarm device coupled to the control system to receive the signal and generate an alarm indication.

35. The spray applicator of claim 33, wherein the sensor element further comprises:
a first electrode; and
a second electrode spaced apart from the first electrode.

36. A spray applicator, comprising:
a gun configured to receive a liquid and atomize the liquid; and
a supply vessel coupled to the gun that supplies the liquid to the gun, the supply vessel retaining a volume of the liquid and including a level sensor responsive to the volume retained by the supply vessel, the level sensor including a sensor element configured to detect a liquid volume solely by sensing a resistance property of the liquid;
wherein the sensor element further comprises:
a first electrode; and
a second electrode spaced apart from the first electrode; and
wherein the first electrode and the second electrode are positioned adjacent to a wall of the supply vessel, the first electrode and the second electrode being spaced apart from the wall of the supply vessel by an insulating layer interposed between the wall and the first and second electrodes.

37. The spray applicator of claim 36, wherein the first electrode and the second electrode are formed on opposing sides of an insulating substrate.

38. The spray applicator of claim 36, wherein the supply vessel further includes a wall that comprises one of the first electrode and the second electrode.

39. A spray applicator, comprising:
   a gun configured to receive a liquid and atomize the liquid; and
   a supply vessel coupled to the gun that supplies the liquid to the gun, the supply vessel retaining a volume of the liquid and including a level sensor responsive to the volume retained by the supply vessel, the level sensor including a sensor element configured to detect a liquid volume solely by sensing a resistance property of the liquid;

wherein the level sensor further includes a control system coupled to the supply vessel that generates a signal when a predetermined liquid volume is retained in the supply vessel; and wherein the control system includes a voltage-sensing network coupled to a current source.

* * * * *